(12) United States Patent (10) Patent No.: US 12,674,746 B2

Park et al. (45) Date of Patent: Jul. 7, 2026

(54) TIP-ENHANCED SPECTROSCOPY

(71) Applicant: POSTECH RESEARCH AND BUSINESS DEVELOPMENT FOUNDATION, Pohang-si (KR)

(72) Inventors: Kyoung-Duck Park, Pohang-si (KR); Yeonjeong Koo, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 101 days.

(21) Appl. No.: 18/522,026

(22) Filed: Nov. 28, 2023

(65) Prior Publication Data

US 2024/0230520 A1     Jul. 11, 2024

(30) Foreign Application Priority Data

Jan. 9, 2023     (KR) ........................ 10-2023-0003096

(51) Int. Cl.
G01N 21/17 (2006.01)
G01N 21/64 (2006.01)
(Continued)

(52) U.S. Cl.
CPC ....... G01N 21/1702 (2013.01); G01N 21/658 (2013.01); G01Q 30/02 (2013.01); G01Q 60/06 (2013.01); G01Q 60/22 (2013.01); G01Q 60/32 (2013.01); G01Q 60/38 (2013.01); G01Q 70/08 (2013.01); G01N 2021/1708 (2013.01); G01N 21/648 (2013.01); G01Q 20/04 (2013.01)

(58) Field of Classification Search
CPC ............. G01N 21/1702; G01N 21/658; G01N 21/648; G01N 2021/1708; G01Q 30/02; G01Q 60/06; G01Q 60/22; G01Q 60/32; G01Q 60/38; G01Q 70/08; G01Q 20/04
See application file for complete search history.

(56) References Cited

U.S. PATENT DOCUMENTS

| 2005/0212529 | A1* | 9/2005 | Huang ................... | G01Q 30/06 |
| | | | | 324/633 |
| 2011/0188034 | A1* | 8/2011 | Stuke ........................ | G01J 3/44 |
| | | | | 977/953 |

(Continued)

FOREIGN PATENT DOCUMENTS

| JP | 5922240 B2 | 5/2016 |
| WO | WO-2018/089022 A1 | 5/2018 |

OTHER PUBLICATIONS

Pfitzner, Emanuel, and Joachim Heberle. "Infrared scattering-type scanning near-field optical microscopy of biomembranes in water." The Journal of Physical Chemistry Letters 11.19 (2020): 8183-8188. (Year: 2020).*

(Continued)

*Primary Examiner* — Dominic J Bologna
(74) *Attorney, Agent, or Firm* — Morgan, Lewis & Bockius LLP

(57) ABSTRACT

A tip-enhanced spectroscopy may include a substrate on which liquid containing an analyte is to be positioned, a tip extending from a fixed end to a free end adjacent to a location for the analyte, and a vibration source configured to harmonically vibrate the tip based on a preset natural frequency. The preset natural frequency may be a natural frequency of a tuning fork.

4 Claims, 9 Drawing Sheets

20

TIP IMMERSION DEPTH
$d_i$ wet-TEPL 1          10

(51) Int. Cl.

| | |
|---|---|
| *G01N 21/65* | (2006.01) |
| *G01Q 20/04* | (2010.01) |
| *G01Q 30/02* | (2010.01) |
| *G01Q 60/06* | (2010.01) |
| *G01Q 60/22* | (2010.01) |
| *G01Q 60/32* | (2010.01) |
| *G01Q 60/38* | (2010.01) |
| *G01Q 70/08* | (2010.01) |

(56)     References Cited

U.S. PATENT DOCUMENTS

| | | | |
|---|---|---|---|
| 2011/0188035 A1* | 8/2011 | Kuo ......................... | G01J 3/44 |
| | | | 977/953 |
| 2014/0310839 A1* | 10/2014 | Wickramasinghe ... | G01N 21/65 |
| | | | 850/40 |
| 2015/0177275 A1* | 6/2015 | Nambu ................. | G01Q 10/04 |
| | | | 850/3 |
| 2016/0003866 A1* | 1/2016 | Chaigneau ............ | G01Q 20/04 |
| | | | 850/1 |
| 2018/0203037 A1* | 7/2018 | Walter ................. | G01Q 10/045 |

OTHER PUBLICATIONS

Pfitzner, Emanuel et al., "Infrared Scattering-Type Scanning Near-Field Optical Microscopy of Biomembranes in Water", Journal of Physical Chemistry Letters, vol. 11, No. 19, Sep. 8, 2020 (Sep. 8, 2020), pp. 8183-8188.

Huang, Fu Min et al: "Fluorescence enhancement and energy transfer near a metal tip", Proceedings SPIE, Nanophotonics, vol. 6195, Apr. 20, 2006 (Apr. 20, 2006), pp. 61951H-1-61951H-8.

Meyer, Robert et al., "Latest instrumental developments and bioanalytical applications in tip-enhanced Raman spectroscopy", Trac Trends in Analytical Chemistry, Elsevier, Amsterdam, NL, vol. 102, Feb. 28, 2018 (Feb. 28, 2018), pp. 250-258.

Extended European Search Report of Application No. 23211540.2, dated May 22, 2024, 10 pages.

Whitney, Scott. "Vibrations of cantilever beams: Deflection, frequency, and research uses." Website: Apr. 23.10 (1999): 2-5.

Office Action in KR Patent Application No. 10-2023-0003096 dated Feb. 26, 2026, 4 pages. (Note: US-2018/0203037 and Pfitzner et al. already submitted.).

* cited by examiner

TIP-ENHANCED SPECTROSCOPY

CROSS REFERENCE TO RELATED APPLICATION

This application claims priority from Republic of Korea Patent Application No. 10-2023-0003096, filed on Jan. 9, 2023, which is hereby incorporated by reference in its entirety.

BACKGROUND

Field

The present disclosure relates to a tip-enhanced spectroscopy, and more specifically, a tip-enhanced spectroscopy that can precisely observe analytes present in liquid.

Related Art

A tip-enhanced spectroscopy replaces a tip used in atomic force microscopy with a plasmonic material-based tip to focus strong light into an area of tens of nanometers, exceeds a diffraction limit of light, and thus, can explore optical properties of materials at the tens of nanometer level.

Since the performance of the tip-enhanced microscopes responds sensitively to the operating environment, the objects measured are generally limited to analytes exposed to vacuum or air. Accordingly, there is a need for tip-enhanced nano-spectroscopy and imaging technology that can observe various analytes that may exist in liquid environment, such as biomolecules existing in liquid, bio-samples such as viruses, and water-decomposition energy production materials.

SUMMARY

An object of the present disclosure is to provide a tip-enhanced spectroscopy that can increase the sensitivity of measurement while securing a tip of sufficient length to reach a sample in liquid. Another aspect of the present disclosure is to provide a tip-enhanced spectroscopy that minimizes the effect of surface tension of liquid on the tip in a tip-enhanced spectroscopy.

Objects in the present disclosure are not limited to the objects mentioned above, and other objects not mentioned will be clearly understood by those skilled in the art from the description below.

According to an aspect of the present disclosure, there is provided a tip-enhanced spectroscopy including: a substrate on which liquid containing an analyte is positioned; a tip extending from a fixed end to a free end adjacent to the analyte; and a vibration source configured to harmonically vibrate the tip based on a preset natural frequency.

Other specific details of the present disclosure are included in the detailed description and drawings.

Embodiments of the present disclosure have least the following effects.

According to the embodiment disclosed in the present disclosure, the shape of the harmonic vibration is adjusted through the shape of the tip to secure the length of the tip that can reach the sample in the liquid while minimizing the displacement of the free end of the tip, and thus, spatial resolution can be improved.

Moreover, based on the location where the tip and the surface of the liquid meet, the effect of the surface tension of the liquid on the harmonic vibration of the tip can be minimized.

Effects of the present disclosure are not limited to those exemplified above, and a variety of other effects are included in the present specification.

DESCRIPTION OF EXEMPLARY EMBODIMENTS

Figure 1A:
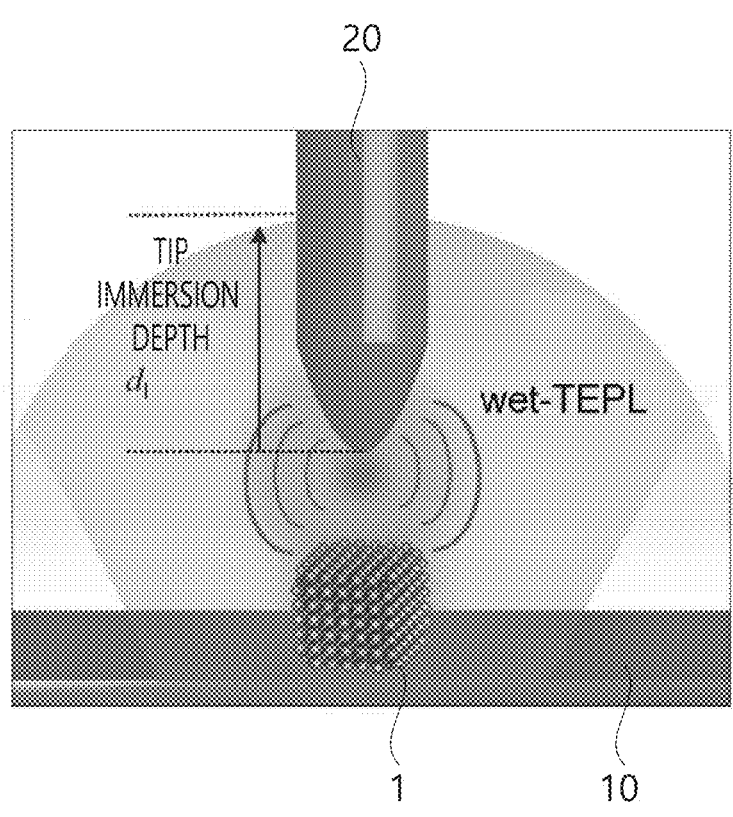
FIGS. 1A and 1B are diagrams schematically illustrating a portion of a tip-enhanced spectroscopy according to one embodiment disclosed in the present disclosure.

Advantages and features of the present disclosure, and how to achieve them, will become clear by referring to the embodiments described in detail below along with the accompanying drawings. However, the present disclosure is not limited to the embodiments disclosed below and may be implemented in various different forms. These embodiments are provided solely to ensure that the disclosure of the present disclosure is complete and to fully inform those skilled in the art of the present disclosure of the scope of the invention, and the present disclosure is defined only by the scope of the claim.

Additionally, the embodiments described in this specification will be described with reference to cross-sectional views and/or schematic diagrams, which are ideal illustrations in the present disclosure. Accordingly, the form of the illustration may be modified depending on manufacturing technology and/or tolerance. Moreover, in each drawing illustrated in the present disclosure, each component may be illustrated somewhat enlarged or reduced in consideration of convenience of explanation. Like reference numerals refer to like elements throughout the specification.

Hereinafter, with reference to FIGS. 1A to 4B, a tip-enhanced spectroscopy and an observation method thereof according to one embodiment of the present disclosure will be described in detail.

Figure 1B:
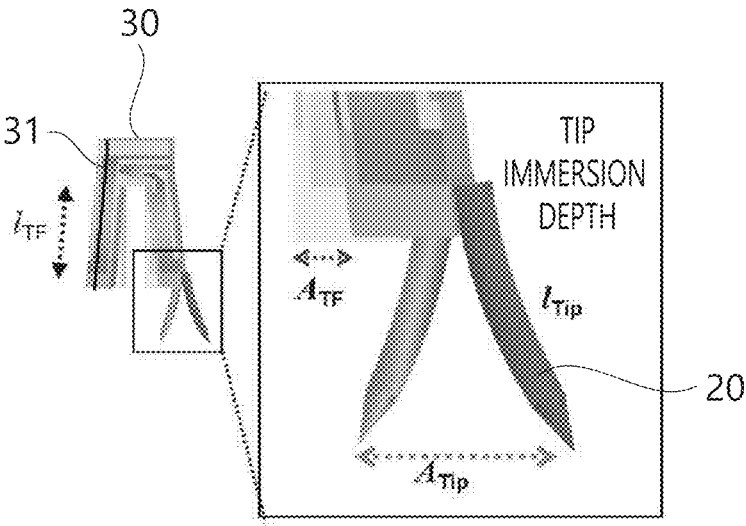

FIGS. 1A and 1B are diagrams schematically illustrating a portion of a tip-enhanced spectroscopy according to one embodiment disclosed in the present disclosure. Referring to FIGS. 1A and 1B, the tip-enhanced spectroscopy according to one embodiment of the present disclosure may be used for analysis of an analyte 1 contained in liquid, and include a metal substrate 10, a tip 20, a vibration unit including a vibration source, a light source, unit, and a spectroscope.

FIGS. 1A and 1B are diagrams schematically illustrating a relationship between the analyte (1) and the tip 20 contained in the liquid. The analyte 1 is positioned on the metal substrate 10. The metal substrate 10 may include one or more types selected from the group consisting of, for example, gold (Au), silver (Ag), aluminum (Al), copper (Cu), cobalt (Co), chromium (Cr), platinum (Pt), palladium (Pd), rhodium (Rh), titanium (Ti), and nickel (Ni). The material of the metal substrate 10 is not limited as long as it can form a nanocavity with the plasmonic tip 20, which will be described later. Referring to one embodiment according to the present disclosure illustrated in FIGS. 1A and 1B, the metal substrate 10 may be formed of gold (Au).

The analyte 1 is a substance that is subject to analysis using the tip-enhanced microscope and may have a size of several nanometers. The analyte 1 may be located on an upper surface of the substrate 10 in a state of being contained in a liquid solvent. The liquid may be positioned on the upper surface of the substrate 10 due to surface tension and viscosity.

The analyte 1 may be a quantum dot, and the quantum dot may be placed on the metal substrate 10 or by coating an oxide layer on the metal substrate 10. The coating may be, for example, spray coating, spin coating. In the coating, a highly volatile organic solvent, that is, hexane is mixed with the quantum dots, then the quantum dot is coated, the organic solvent is removed, and thus, a quantum dot layer of a single level quantum dot, quantum dot film, or quantum dot sheet may be obtained. After forming the quantum dot, an oxide layer may be further formed on the quantum dot. Moreover, a few drops of a quantum dot solution mixed in an organic solvent may be placed on the metal substrate 10 or on the oxide layer on the metal substrate 10. When measuring the luminescence properties of the quantum dot in a liquid solvent, the disadvantage of the quantum dot being rapidly oxidized by exposure to air and reducing luminescence efficiency can be overcome. The quantum dot, which is the analyte 1, may be a semiconductor material and/or a two-dimensional material, and may include, for example, a perovskite material, a transition metal chalcogenide compound (for example, MX2 (M is a transition metal element (groups 4 to 6 in the periodic table) and X is a chalcogen element (group 16 in the periodic table)), graphene, Hexagonal Boron Nitride (h-BN), hexagonal boron-carbon-nitrogen (h-BCN), fluorographene, graphene oxide, or the like. However, the quantum dot is not limited to the above examples.

The analyte 1 may be a biomolecule, cell, or the like. When the biomolecule or cell is measured in a liquid solvent, their characteristics may be observed while maintaining their living state. The biomolecules or cells may be, for example, proteins and cancer cells.

The vibration unit may include the tip 20 and the vibration source. The tip 20 is formed in the shape of a needle extending from a fixed end to a free end, and the tip 20 passes through the surface of the liquid and may be positioned so that the free end is adjacent to the analyte 1. The tip 20 may be formed of a plasmonic metal. The tip 20 may include one or more types selected from the group consisting of gold (Au), silver (Ag), aluminum (Al), copper (Cu), cobalt (Co), chromium (Cr), platinum (Pt), palladium (Pd), rhodium (Rh), titanium (Ti), and nickel (Ni). Referring to one embodiment according to the present disclosure illustrated in FIGS. 1A and 1B, the tip 20 may be formed to include a tip made of gold (Au).

The vibration source may be a tuning fork 30 formed on one side of the fixed end of the tip 20 to vibrate the tip 20. The tuning fork 30 may be coupled to the tip 20 by an adhesive. For example, the tuning fork 30 may be formed as a quartz tuning fork shaped to have bifurcated legs.

A detection circuit 31 capable of detecting the amplitude and phase of vibration may be installed in the tuning fork 30. The detection circuit 31 is not limited as long as it is a device that can detect the amplitude and phase. When the tip 20 is adjacent to the analyte 1, a shar force may occur between the free end of the tip 20 and the surface of the analyte 1. Specifically, the shear force refers to the Van der Waals' force that occurs between the end of the tip 20 and the surface of the analyte 1 when the tip 20 approaches the surface of the sample by 20 nm or less.

When an alternating current voltage with a predetermined frequency is applied to the tuning fork 30, the tip 20 may vibrate harmonically within a certain range of frequencies due to the vibration of the tuning fork 30. In this case, when the free end of the tip 20 is adjacent to the analyte 1, vibration characteristics of the vibration unit change due to the shear force described above. The detection circuit connected to the tuning fork 30 may detect changes in the amplitude and phase of vibration caused by the shear force, and based on the change in vibration characteristics, detect the distance between the tip 20 and the analyte 1, and detect the optical properties of the analyte 1.

In the harmonic vibration of the tip 20, as an amplitude ATip of the free end for the analyte 1 becomes smaller, spatial resolution of the tip-enhanced microscope can be improved. Generally, the length of the tip is reduced to reduce the amplitude ATip of the free end, but in order to observe the analyte contained in the liquid, the tip should pass through the liquid and reach the analyte, and thus, the tip having sufficient length must be secured. In one embodiment according to the present disclosure, the amplitude ATip of the free end of the tip 20 may be reduced by controlling the shape of the harmonic vibration of the tip 20 while ensuring the sufficient length of the tip 20.

The tip 20 may have a plurality of nature frequencies and a mode shape corresponding to each nature frequency. The tip 20 may vibrate according to a mode shape in which there is no node in a first harmonic vibration, vibrate according to a mode shape in which one node exists in a second harmonic vibration, and may vibrate according to a mode shape in which two nodes exist in a third harmonic vibration. In the specification of the present disclosure, nth order harmonic vibration means that the tip vibrates according to the mode shape where n–1 nodes exist. The natural frequency of the vibration source and the corresponding vibration mode shape of the tip may be determined depending on the length of the tip 20. Accordingly, when the length of the tip 20 is appropriately set, the tip 20 can be designed to harmonically vibrate in a desired mode shape by vibration according to the natural frequency of the vibration source. The length of the tip 20 may be formed to have a mode shape that minimizes the amplitude ATip of the free end with respect to the analyte 1 in the harmonic vibration generated by the vibration source.

Figure 2A:
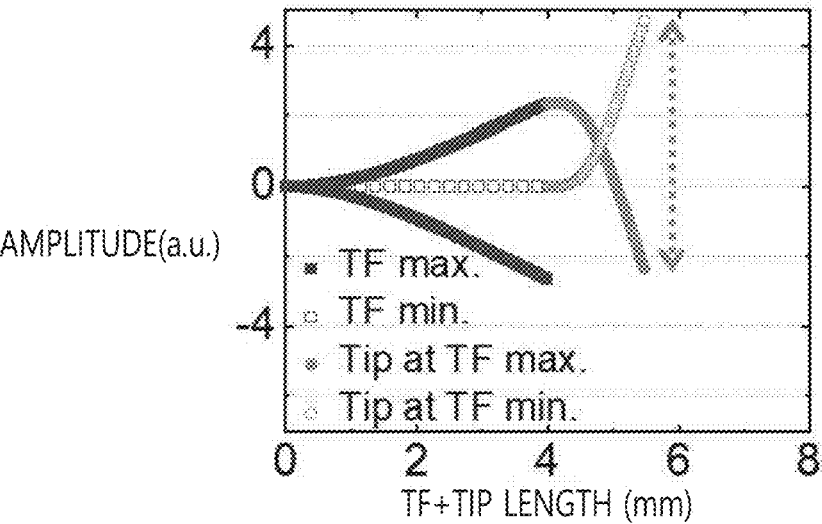
FIGS. 2A to 2C are diagrams illustrating a shape of harmonic vibration according to a length of a tip of the tip-enhanced spectroscopy of FIGS. 1A and 1B.
Figure 2B:
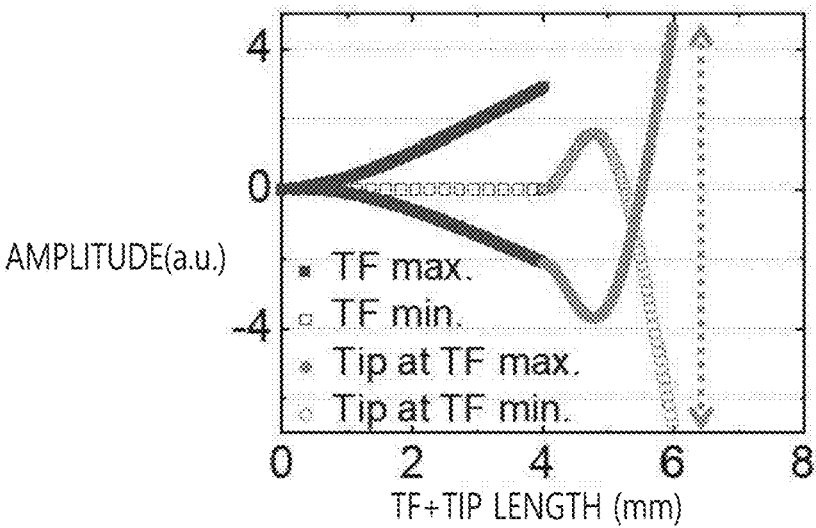
Figure 2C:
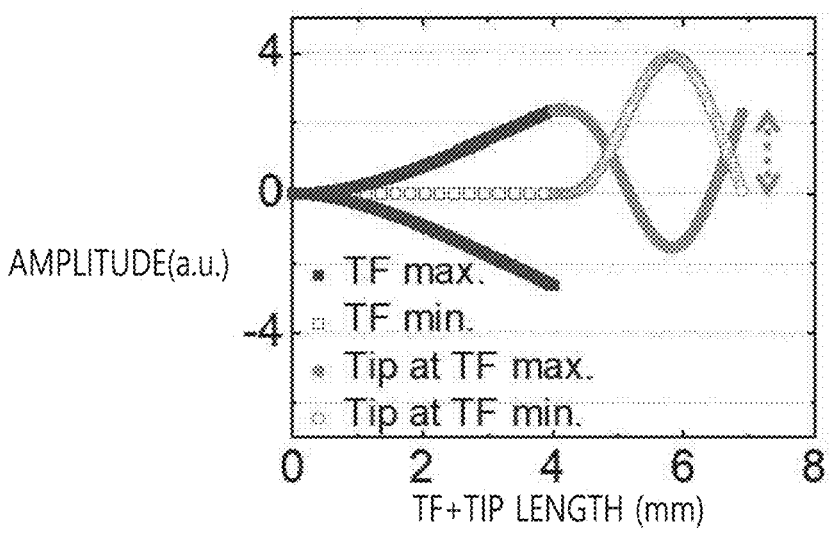

FIGS. 2A to 2C illustrate the mode shape of the tip harmonic vibration according to the length of the tip. In the example illustrated in FIGS. 2A and 2B, a tuning fork with a natural frequency of 32.768 kHz is used, and the harmonic vibration occurs at the tip within a frequency range of 26 kHz to 39 kHz depending on the length of the tip.

In FIG. 2A, the length of the tip is 1.57 mm, and the first harmonic vibration is generated by the vibration of the tuning fork. In FIG. 2B, the length of the tip is 1.93 mm, and the second harmonic vibration is generated by the vibration of the tuning fork. In FIG. 2C, the length of the tip is 3.04 mm, and the third harmonic vibration is generated by the vibration of the tuning fork. Referring to FIG. 2A, since there is no node in the first harmonic vibration of the tip, the amplitude of the free end of the tip increases. Referring to FIG. 2B, in the second harmonic vibration of the tip, only one node exists, and the amplitude of the free end of the tip increases significantly compared to the displacement of the tuning fork. Meanwhile, referring to FIG. 2C, since two nodes exist in the third harmonic vibration of the tip, even when resonance occurs at the tip, the amplitude of the free end of the tip itself can be greatly reduced. Through this, the tip has a long length while the amplitude of the free end is reduced, and thus, spatial resolution is greatly improved.

Figure 3A:
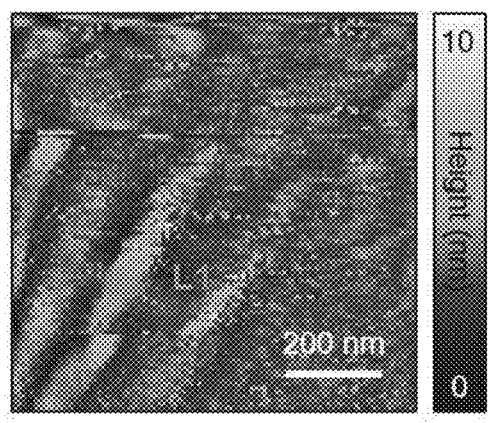
FIGS. 3A and 3B are diagrams illustrating image processing results of embodiments having different lengths of the tip in the tip-enhanced spectroscopy of FIGS. 1A and 1B.
Figure 3A:
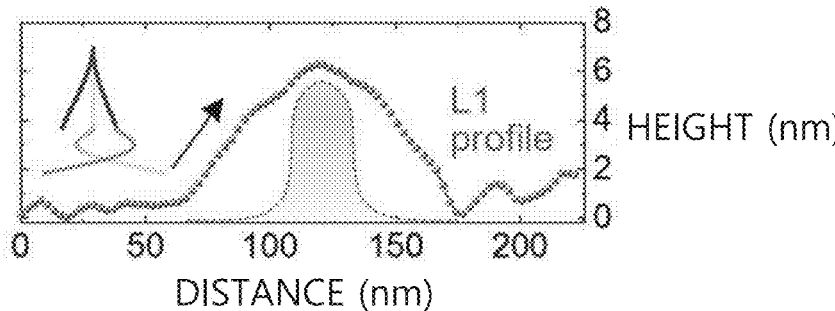
Figure 3B:
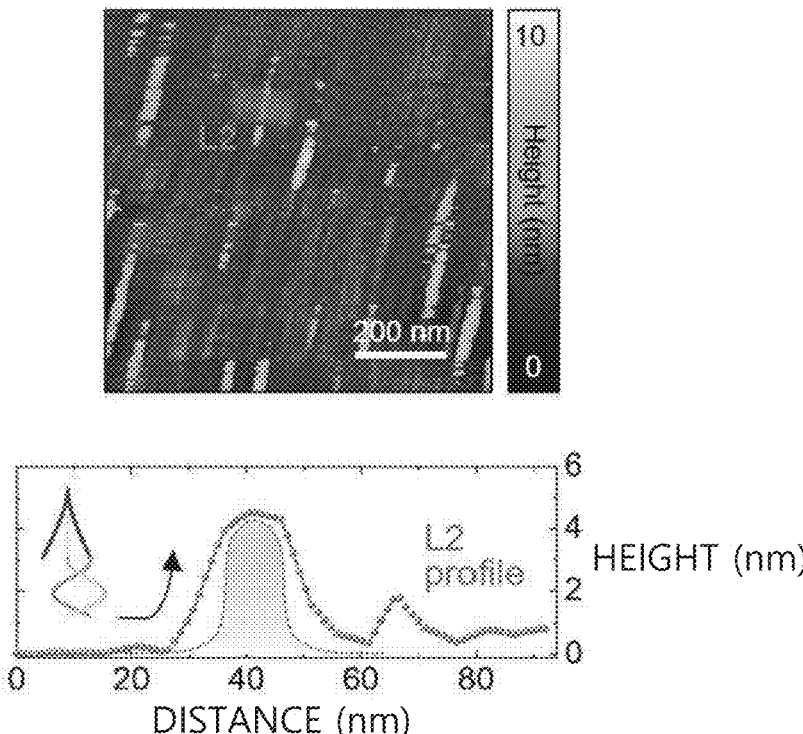

FIGS. 3A and 3B illustrates a comparison of image processing results obtained when the tip 20 is formed with different lengths in one embodiment according to the present disclosure. FIG. 3A illustrates an example in which the length of the tip 20 is 2 mm, and the amplitude of the free end of the tip is very large corresponding to the natural frequency of the vibration source. FIG. 3B illustrates an example in which the length of the tip 20 is 3 mm, and the amplitude of the free end of the tip is very small in response to the natural frequency of the vibration source. While an image profile L1 for the analyte 1 does not accurately detect the profile of the actual analyte 1 in the embodiment where the tip 20 is formed to be 2 mm, it can be seen that the image profile L2 for analyte 1 detects the profile of the actual analyte 1 more precisely in the embodiment where the tip 20 is formed to be 3 mm. In this way, when the length of the tip 20 is formed according to one embodiment according to the present disclosure, the spatial resolution of the tip-enhanced spectroscopy can be improved.

Figure 4A:
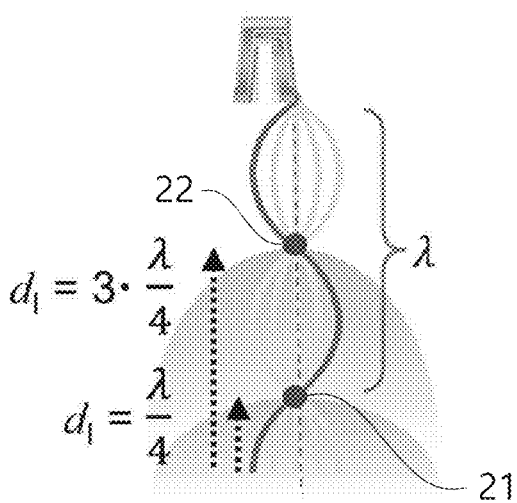
FIGS. 4A and 4B are diagrams schematically illustrating a relationship between the tip and the surface of the liquid in the tip-enhanced spectroscopy of FIGS. 1A and 1B.
Figure 4B:
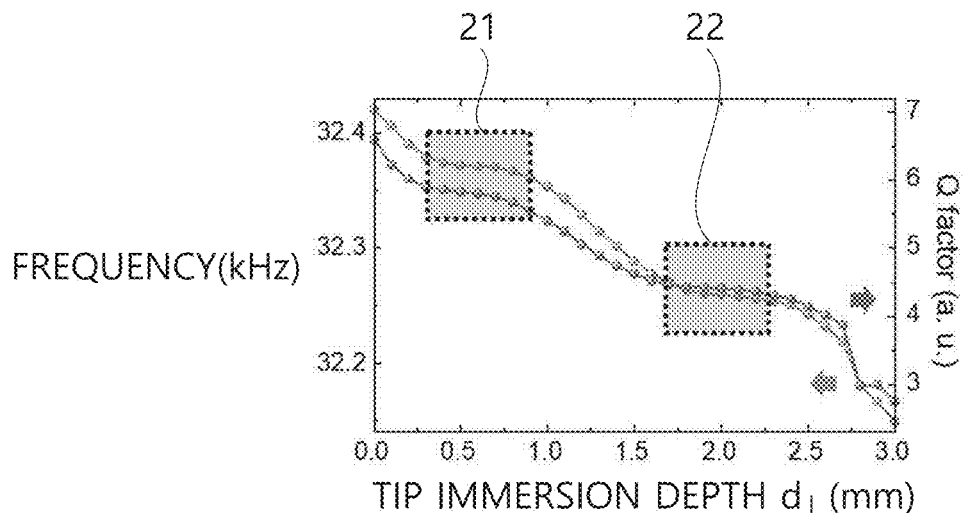

FIGS. 4A and 4B illustrate the relationship between the tip 20 and the surface of the liquid in the tip-enhanced spectroscopy of one embodiment according to the present disclosure. Unlike vacuum or air, liquid has viscosity and also generates surface tension on the surface, and thus, the liquid has a great influence on the harmonic vibration of the tip 20. In harmonic vibrations of the second order or higher, there is a node where little displacement occurs. When the node point that occurs during the harmonic vibration of the tip 20 meets the surface of the liquid, since no displacement of the tip 20 occurs on the surface of the liquid, it is possible to minimize the effect of surface tension on the harmonic vibration of the tip 20.

FIG. 4A is a diagram schematically illustrating the positional relationship between the tip 20 and the surface of the liquid in the tip 20 formed to perform the third harmonic vibration with respect to the natural frequency of the vibration source. Referring to FIG. 4A, the tip 20 may be formed so that the surface of the liquid is located at one of the two node points that exist in the third harmonic vibration. A first node 21 of the tip 20 may be located at ¼ of the wavelength of the third harmonic vibration from the free end, and a second node 22 of the tip 20 may be located at ¾ of the wavelength of the third harmonic vibration from the free end. Alternatively, the first node 21 of the tip (20) may be located at a point spaced apart from the fixed end by the wavelength of the third harmonic vibration, and the second node 22 of the tip 20 may be located at a point spaced apart from the fixed end by half the wavelength ($\lambda/2$) of the third harmonic vibration. FIG. 4B illustrates a harmonic vibration occurrence frequency according to an immersion depth dI of the tip 20. Referring to FIG. 4B, it can be seen that a resonance frequency is maintained uniformly in a section corresponding to the first node 21 and the second node 22 of the third harmonic vibration of the tip 20. In order to reduce the amplitude of the free end, preferably, the free end of the tip 20 is located within ¼ of the wavelength of the harmonic vibration from the first node 21, which is the node closest to the free end among the nodes that occur in harmonic vibration.

Optical resonance may be formed between the tip 20 and the metal substrate 10 by applying a light source. Electric charges are concentrated near the tip 20 due to an electrostatic lightning rod effect, and when an excitation light source is applied to the tip of the tip 20, the optical field near the tip 20 can provide a localized surface plasmon resonance (LSPR) effect due to collective resonant oscillations of electrons. The tip 20 may be a tip of tip-enhanced photoluminescence (TEPL) and/or tip-enhanced Raman spectroscopy (TERS).

The light source unit irradiates a light source between the tip 20 and the analyte 1 located on the metal substrate 10, and may include a light source device and an optical probe. The light source device emits a light source. For example, the light source may be a helium (He)-neon (Ne) laser that emits continuous waves, and the diameter may be expanded to improve spatial filtering and spatial coherence using single-mode fiber. The optical probe is formed so that the light source emitted from the light source device can be irradiated between the tip 20 and the analyte 1. For example, the optical probe may include a half-wave plate, a polarizing beam splitter, a 4f system, and an objective lens.

The spectrometer can generate a spectrum based on the photoluminescence signal generated from the analyte 1. The photoluminescence signal generated from the analyte 1 may be, for example, the photoluminescence of plexciton formed by the combination of the plasmon of the plasmonic tip 20 and the exciton of the analyte 1. The spectrum may be a spectrum with respect to intensity of a tip-enhanced signal versus Raman wavenumber using Tip-Enhanced Raman Spectroscopy (TERS), a spectrum of the intensity with respect to the tip-enhanced signal versus energy using tip-enhanced photoluminescence (TEPL), and a spectrum of the intensity of the tip enhancement signal, and a vibration spectrum using Raman and IR active modes.

Using the tip-enhanced spectroscopy in one embodiment according to the present disclosure, unlike the prior art where quantum dots are quickly oxidized when exposed to air and luminous efficiency is reduced, by directly measuring the luminescence properties of quantum dots in a liquid solvent, the limitations of the prior art can be overcome. Therefore, near-field luminescence characteristics can be measured and analyzed directly in a solvent without separately performing a high-temperature post-treatment (atomic layer deposition) process to prevent oxidation of quantum dots.

Using the tip-enhanced spectroscopy in one embodiment according to the present disclosure, biomolecules or cells that can remain alive only in a liquid solvent can be observed. In addition, the characteristics and energy production mechanisms of water-splitting semiconductor samples can be measured and analyzed in the nanoscale area in real time, and the energy production efficiency using light as a catalyst can be improved by using the near-field focusing effect of the plasmonic tip.

Hereinbefore, the description has been made focusing on some examples of tip-enhanced spectroscopy of the present disclosure, but the present disclosure is not limited to the above examples. A person with ordinary knowledge in the technical field to which the present disclosure belongs will understand that the present disclosure can be implemented in other specific forms without changing its technical idea or essential features. Therefore, the embodiments described above should be understood in all respects as illustrative and not restrictive. The scope of the present disclosure is indicated by the patent claims described later rather than the detailed description above, and the meaning and scope of the patent claims and all changes or modified forms derived from the concept of equivalents should be construed as being included in the scope of the present disclosure.

The present disclosure relates to the establishment of a scientific and engineering research base sponsored by the National Research Foundation of Korea (Basic Science Research Institute, 1345347881, 2021R1A6A1A10042944, 2020-03-01~2021-02-28). In addition, the present disclosure relates to information and communication broadcasting innovation talent training (R & D) (nurturing quantum information experts through quantum information device research, 1711174062, 00164799, 2022-07-01 to 2022-12) under the support of the Information and Communications Planning and Evaluation Institute.

What is claimed is:

1. A tip-enhanced spectroscopy device comprising:

a substrate on which liquid containing an analyte is to be positioned;

a tip extending from a fixed end to a free end adjacent to a location for the analyte; and a vibration source configured to harmonically vibrate the tip based on a preset natural frequency such that the free end has an oscillation amplitude oriented perpendicular to a longitudinal direction of the tip;

wherein the vibration source is configured to harmonically vibrate the tip in a vibration mode having at least two nodes; and wherein the free end has an oscillation amplitude smaller than an oscillation amplitude of the free end when the tip vibrates in a first harmonic vibration.

2. The tip-enhanced spectroscopy device of claim 1, wherein the tip is formed to harmonically vibrate to a third or higher order by the preset natural frequency of the vibration source.

3. The tip-enhanced spectroscopy device of claim 1, wherein a length of the tip is 2.5 to 3.5 mm.

4. The tip-enhanced spectroscopy device of claim 1, wherein the tip is a plasmonic tip formed to include one or more types selected from the group consisting of gold (Au), silver (Ag), aluminum (Al), copper (Cu), cobalt (Co), chromium (Cr), platinum (Pt), palladium (Pd), rhodium (Rh), titanium (Ti), and nickel (Ni).

* * * * *